United States Patent Office 3,637,895
Patented Jan. 25, 1972

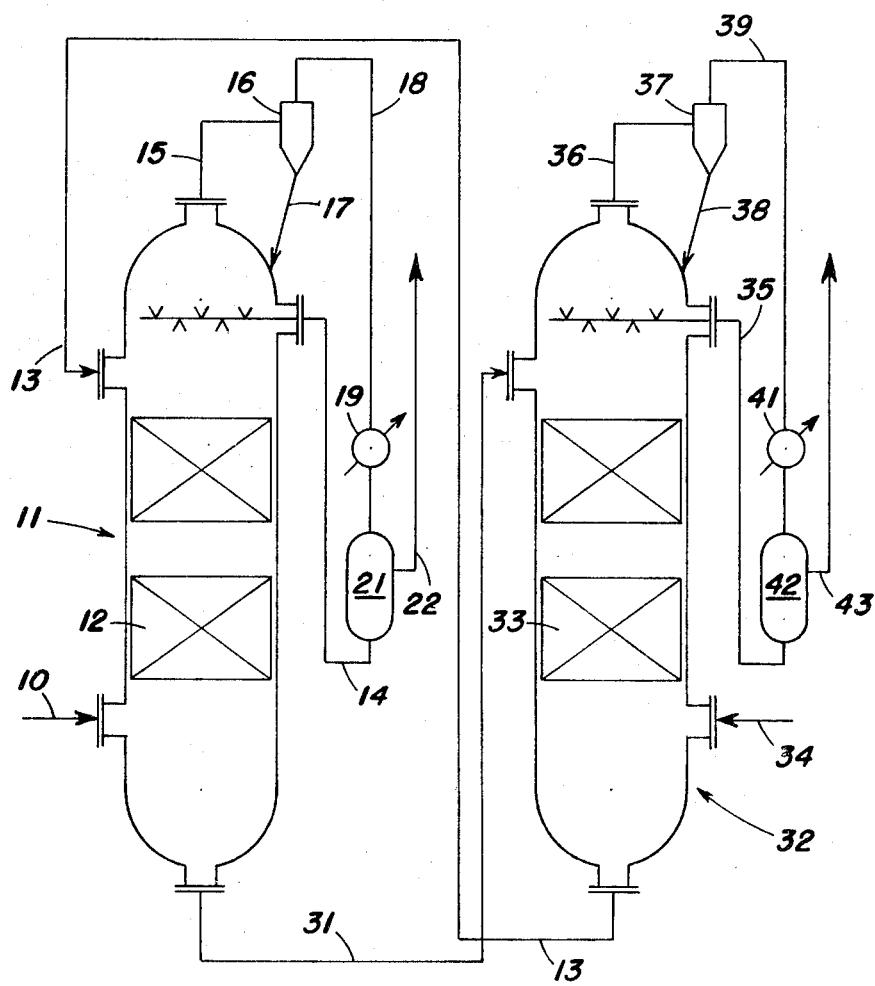

3,637,895
DEHYDROGENATION PROCESS USING MOLTEN COPPER CHLORIDES AND OXYCHLORIDE MIXTURES
Herbert Riegel, Palisades Park, N.J., Harvey D. Schindler, New York, N.Y., Morgan C. Sze, Upper Montclair, N.J., and Maurice E. Brooks, Great Neck, N.Y., assignors to The Lummus Company, Bloomfield, N.J.
Filed Oct. 23, 1968, Ser. No. 769,811
Int. Cl. B01j 11/78; C07c 5/20, 11/04
U.S. Cl. 260—683.3                    12 Claims

ABSTRACT OF THE DISCLOSURE

Process for dehydrogenating a feed containing either an alkane, cycloalkane, mono-halo substituted derivative thereof, or alkyl substituted aromatic hydrocarbon wherein the feed is contacted with a melt containing a multivalent metal halide in both its higher and lower valence state, such as a mixture of cupric and cuprous chloride. In accordance with a preferred embodiment, the melt is previously contacted with an oxygen containing gas to produce the corresponding oxyhalide of the metal, whereby the reaction may be effected on a continuous basis.

This invention relates to the production of olefinically unsaturated compounds and more particularly to the dehydrogenation of either an alkane, cycloalkane, a mono-halo substituted alkane or cycloalkane or an alkyl substituted aromatic hydrocarbon to produce the corresponding olefinically unsaturated compound.

The dehydrogenation of alkanes or cycloalkanes to produce the corresponding unsaturated compounds is generally known in the art. Thus, for example, an alkane is generally dehydrogenated to produce a corresponding olefinically unsaturated hydrocarbon by either high temperature thermal or catalytic cracking, but such processes have poor selectivity to the desired olefin. Thus, for example, in a process for dehydrogenating propane by either catalytic or thermal cracking, the selectivity is generally poor, resulting in more ethylene than propylene in the reactor effluent. In the cracking of a cycloalkane feed, such as cyclohexane, the dehydrogenation is generaly uncontrollable, resulting in production of great quantities of benzene, instead of the desired cyclohexene.

Accordingly, an object of this invention is to provide a new and improved process for effecting dehydrogenation.

Another object of this invention is to provide a new and improved process for effecting the dehydrogenation of either an alkane, cycloalkane, mono-halo substituted derivatives thereof, or alkyl substituted aromatic hydrocarbon.

A further object of this invention is to provide a dehydrogenation process having improved selectivity with respect to the desired olefinically unsaturated compound.

These and other objects of the invention should be more readily apparent from reading the following detailed description of the invention with reference to the accompanying drawing wherein:

The drawing is a simplified schematic flow diagram of an embodiment of the invention.

The objects of this invention are broadly accomplished, in one aspect, by contacting a feed containing either an alkane, cycloalkane, mono-halo substituted alkane or cycloalkane, or alkyl substituted aromatic hydrocarbon with a melt containing a multivalent metal halide in both its higher and lower valence state, resulting in dehydrogenation of the feed to the corresponding olefinically unsaturated compound. The contacting may be effected in the presence of other reagents, as hereinafter described, with reference to preferred embodiments of the invention.

The melt contains a halide of a multivalent metal; i.e., a metal having more than one positive valence state, such as manganese, iron, copper, cobalt, and chromium, preferably a chloride or bromide of the metal, with the copper chlorides and bromides, in particular the copper chlorides, being preferred. In the case of higher melting multivalent metal halides, such as copper chlorides, a halide of a univalent metal; i.e., a metal having only one positive valence state, which is nonvolatile and resistant to the action of oxygen under the process conditions is added to the multivalent metal halide to form a molten salt mixture having a reduced melting point. The univalent metal halides, the chlorides and bromides, particularly the chlorides, being preferred, are preferably alkali metal halides, such as potassium and lithium chloride in particular, but it is to be understood that other metal chlorides and mixtures thereof, such as the heavy metal halides of Groups I, II, III and IV of the Periodic Table; e.g., zinc, silver, and thallium chloride, may also be employed. The univalent metal halides are generally added in an amount sufficient to adjust the melting point of the molten salt mixture to a temperature of below about 500° F., and in the case of a salt mixture of copper chloride and potassium chloride, the composition of the melt ranges between about 20% and about 40%, preferably about 30%, by weight, potassium chloride, with the remainder being copper chloride. It is to be understood, however, that in some cases the catalyst melt may have a melting point higher than 500° F., provided the catalyst remains in the form of the melt throughout the processing steps. It is further to be understood that the melt may contain a mixture of multivalent metal halides or other reaction promoters. It is also to be understood that in some cases, metal halides may be maintained as a melt without the addition of a univalent metal halide.

The feed, as hereinabove described, may be an alkane, cycloalkane, mono-halo substituted alkane or cycloalkane, with bromo- and chloro-, particularly chloro, substituted derivatives being generally preferred, or an alkyl substituted aromatic hydrocarbon. The alkane is preferably one which contains from about 2 to about 18 carbon atoms, such as, ethane, propane, n-butane, isobutane, hexanes, heptanes, etc., and the cycloalkane is preferably one having from about 5 to about 12 carbon atoms, preferably cyclohexane or cyclododecane. The mono-halo substituted alkane or cycloalkane is preferably a chloro-substituted derivative of one of the hereinabove mentioned preferred alkanes or cycloalkanes. The alkyl substituted aromatic hydrocarbon may contain one or more alkyl groups and generally contains a benzene or naphthalene nucleus, with the alkyl group preferably having from about 2 to about 4 carbon atoms; e.g., ethyl benzene. It is to be understood that the feed to be dehydrogenated may contain two or more of the hereinabove described compounds.

The reaction sequence for dehydrogenating an alkane cycloalkane, mono-halo substituted derivative thereof, or an alkyl substituted aromatic hydrocarbon is believed to proceed through a halo-substituted derivative as represented by the following equations, using propane, cyclohexane and ethyl chloride as representative examples of a feed, and copper chloride as a representative example of a multivalent metal halide:

(1) $C_3H_8 + 2CuCl_2 \rightarrow C_3H_7Cl + 2CuCl + HCl$
(2) $C_3H_7Cl \rightarrow C_3H_6 + HCl$
(3) $C_6H_{12} + 2CuCl_2 \rightarrow C_6H_{11}Cl + 2CuCl + HCl$
(4) $C_6H_{11}Cl \rightarrow C_6H_{10} + HCl$
(5) $C_2H_5Cl + 2CuCl_2 \rightarrow C_2H_4Cl_2 + 2CuCl + HCl$
(6) $C_2H_4Cl_2 \rightarrow C_2H_3Cl + HCl$ It is to be understood that the hereinabove described equations are only representative of the reaction sequence which is believed to occur and, therefore, the scope of the invention is not to be limited by such a theoretical reaction sequence.

It should be apparent from the hereinabove described reaction sequence that there is a continuous depletion of the higher valent metal halide, i.e., cupric chloride, and a net production of hydrogen chloride. Therefore, if the reaction is to be effected on a continuous basis, a provision must be made for regeneration of the cupric chloride and disposal of the hydrogen chloride.

In accordance with a preferred embodiment of the invention, the melt containing a mixture of a multivalent metal halide in both its higher and lower valence state may be initially contacted with oxygen in one reaction zone and the resulting product containing the corresponding oxyhalide of the multivalent metal, is then contacted with the feed to be dehydrogenated in a separate reaction zone. This procedure is of greater commercial value in that oxygen does not contact the feed, thereby decreasing any losses which may result from combustion of the feedstock. This procedure may be represented by the following reaction sequence, using propane as a representative example, with the reaction represented by Equation 9 being effected in the oxygen contacting zone and the reactions represented by Equations 7, 8 and 10 being effected in a separate reaction zone.

(7) $C_3H_8 + 2CuCl_2 \rightarrow C_3H_7Cl + HCl + 2CuCl$
(8) $C_3H_7Cl \rightarrow C_3H_6 + HCl$
(9) $2CuCl + 1/2O_2 \rightarrow CuOCuCl_2$
(10) $2HCl + CuOCuCl_2 \rightarrow 2CuCl_2 + H_2O$ The combination of Equations 7, 8, 9 and 10, results in Equation 11:

(11) $C_3H_8 + 1/2O_2 \rightarrow C_3H_6 + H_2O$

Thus, in accordance with this embodiment there is no net production of hydrogen chloride and no net depletion of cupric chloride.

As a further embodiment, the feed to be dehydrogenated is contacted with the melt, containing the multivalent metal halide in both its higher and lower valence state, in the presence of a free-halogen containing gas, corresponding to the halide of the multivalent metal. This procedure may be represented by the following reaction sequence, using propane as a representative example:

(12) $C_3H_8 + 2CuCl_2 \rightarrow C_3H_7Cl + HCl + 2CuCl$
(13) $C_3H_7Cl \rightarrow C_3H_6 + HCl$
(14) $2CuCl + Cl_2 \rightarrow 2CuCl_2$ This procedure although maintaining essentially no net loss of cupric chloride, results in a net production of hydrogen chloride and consequently is less preferred than the hereinabove described preferred embodiment. It is to be understood that similarly to the preferred embodiment, the melt may be contacted with the free halogen containing gas separately from the dehydrogenation step to replenish the melt in accordance with the reaction represented by Equation 14.

As a further alternative embodiment, the hydrogen chloride generated in the dehydrogenation reaction, as represented in Equations 1-6, may be recovered from the effluent and employed to contact the cupric chloride depleted melt along with any oxygen-containing gas to regenerate cupric chloride, as represented by the following equations:

(15) $2CuCl + 1/2O_2 \rightarrow CuOCuCl_2$
(16) $CuOCuCl_2 + 2HCl \rightarrow 2CuCl_2 + H_2O$ This procedure is also less preferred, but may be employed within the scope of the invention.

The dehydrogenation as hereinabove described, is generally effected at temperatures from about 700° to about 1200° F. preferably from about 750° to about 1100° F., and pressures from about 1 to about 30 atmospheres. The contacting is preferably effected in a countercurrent fashion, with the feed as a continuous vapor phase, at residence times from about 1 to about 100 seconds. The choice of optimum reaction conditions varies with the particular reactants and, therefore, the hereinabove described conditions are illustrative of the invention and the scope thereof is not to be limited thereby. Thus, for example, dehydrogenation in some cases may be effected at temperatures higher than about 1200° F., but at such higher temperatures there may be some unwanted side reactions. It is further to be understood that by-products, e.g., chlorinated derivatives, may also be produced during the reaction and, therefore, the reaction conditions are controlled to reduce such production. In addition, some coupling may result when the feed contains an alkane, i.e., a hydrocarbon containing a number of carbon atoms equal to twice the number of carbon atoms of the alkane feed may be produced. The separation of the resulting by-products in order to recover the desired product may be effected by a wide variety of well-known procedures and, therefore, no detailed explanation thereof is deemed necessary.

In the embodiments of the invention wherein the melt is previously contacted with chlorine, oxygen or hydrogen chloride in a separate reaction zone, the reaction conditions are similar to those for the dehydrogenation process, except that lower temperature may be employed, e.g., as low as 500° F.

It should be further apparent from the hereinabove noted dehydrogenation process reaction sequence, that the melt containing the multivalent metal halide in some cases participates in the reaction sequence and accordingly does not behave only as a catalyst. Therefore, the multivalent metal halides must be present in an amount sufficient to meet the stoichiometric requirements of the reaction sequence and in general the melt composition should contain at least about 3% by weight, of the higher valent metal halide, e.g., cupric chloride, although greater amounts are generally preferred. In some cases, the addition of chlorine may be required in order to maintain the necessary quantity of cupric chloride.

The melt, in addition to functioning as a reactant and/or catalyst, is a temperature regulator. Thus, the circulating melt has a high heat absorption capacity thereby preventing runaway reaction during the exothermic dehydrogenation and oxygen contacting steps. The absorbed heat of reaction may be employed to heat the various reactants to reaction temperature. Alternatively, or in addition to such an expedient, the melt may be contacted with an inert gas coolant to remove any additional heat of reaction, with the inert gas being subsequently cooled and re-employed for removing heat from the melt. It should be apparent, however, that if additional heat is required such heat may be supplied from an external source. It should also be apparent that the heat absorption capacity of the melt functions to maintain essentially isothermal conditions during the reaction.

The invention will now be further described with reference to an embodiment thereof illustrated in the accompanying drawing. It is to be understood however, that the scope of the invention is not to be limited thereby.

Referring now to the drawing, an oxygen-containing gas in line 10, such as air, is introduced into a reactor 11, containing suitable packing 12 or other liquid-vapor contacting devices. A melt containing a multivalent metal halide in both its higher and lower valence state, such as a mixture of cupric and cuprous chloride, is introduced into reactor 11 through line 13 in the form of a melt and countercurrently contacts the ascending oxygen-containing gas. The melt may further contain an alkali metal chloride, such as potassium chloride. As a result of such contact, a portion of the cuprous chloride is exothermically converted to copper oxychloride.

An oxygen depleted gas in the top of the reactor 11 is contacted with a quench liquid introduced through line 14, resulting in condensation of vaporized melt and vaporization of quench liquor. The vaporized quench liquid and oxygen-depleted gas is withdrawn from reactor 11 through line 15 and introduced into a cyclone separator 16 to effect separation of entrained catalyst. The separated catalyst is withdrawn from separator 16 through line 17 and returned to the reactor 11. The combined oxygen-depleted gas-vaporized quench liquid is withdrawn from separator 16 through line 18, passed through condenser 19 to effect condensation of the quench liquid and the vapor-liquid mixture introduced into a separator 21. The quench liquid is withdrawn from separator 21 in line 14 and recycled to the reactor 11. The oxygen-depleted gas is withdrawn from separator 21 through line 22 and passed to waste.

The melt, containing a mixture of cuprous chloride, cupric chloride and copper oxychloride, is withdrawn from reactor 11 through line 31 and introduced into the top of a dehydrogenation reactor 32, containing suitable packing 33 or other gas-liquid contact devices. A feed to be dehydrogenated, such as propane, cyclohexane, or ethyl chloride, is introduced into the bottom of vessel 32 through line 34 and countercurrently contacts the descending melt to effect dehydrogenation of the feed. The melt withdrawn from the bottom of vessel 32 through line 13 is recycled to reactor 11.

A gaseous effluent containing the corresponding olefinically unsaturated compound, is contacted in the top of vessel 32 with a quench liquid introduced through line 35, resulting in condensation of vaporized catalyst melt and vaporization of the quench liquid. The vaporized quench liquid and effluent is withdrawn from vessel 32 through line 36 and introduced into a cyclone separator 37 to effect removal of entrained catalyst. The separated catalyst is withdrawn from separator 37 through line 38 and recycled to the vessel 32. The vaporized quench liquid and gaseous effluent are withdrawn from separator 37 through line 39, passed through condenser 41 to effect condensation and cooling of the quench liquid and the gas-liquid mixture introduced into a separator 42. The now cooled quench liquid is withdrawn from separator 42 through line 35 and recycled to the reactor 32. The effluent is withdrawn from separator 42 through line 43 and passed to separation and recovery.

It is to be understood that numerous variations of the hereinabove described processing sequence are possible within the spirit and scope of the invention. Thus, for example, the dehydrogenation reaction may be effected in a single reactor having two separate zones, one for the introduction of an oxygen-containing gas for contact with the melt and the other for contacting the resulting oxygenated melt with the feed to be dehydrogenated. In addition, a halogen containing gas, such as chlorine, may be employed instead of an oxygen-containing gas in which case as hereinabove described, there is a net production of hydrogen chloride. These and other modifications should be apparent to those skilled in the art from the teachings contained herein.

The invention is further illustrated by the following examples but the scope of the invention is not to be limited thereby.

EXAMPLE I

Cyclohexane was dehydrogenated by countercurrently contacting cyclohexane vapor with a copper chloride containing melt, which had previously been contacted with air, under the conditions tabulated below:

| | | |
|---|---|---|
| Reaction temperature | °C | 469 |
| Reaction pressure | atm | 1 |
| Salt: | | |
| KCl | wt. percent | 27 |
| CuCl | do | 56 |
| $CuCl_2$ | do | 17 |
| Residence time | seconds | 8 |
| Duration of test | hours | 2 |
| Gas hourly space velocity, GHSV | | 85 |
| Feed rate, cyclohexane liquid | ml./hr | 147 |
| Conversion | percent | 15.0 |

Products

| Components: | Mole percent cyclohexane converted |
|---|---|
| $CH_4$ | 0.3 |
| $CO_2$ | 3.4 |
| $C_2H_4$ | 0.3 |
| $C_2H_6$ | 0.5 |
| $C_6H_{12}$ (methyl cyclopentane) | 21.3 |
| $C_6H_{10}$ (cyclohexene) | 51.0 |
| $C_6H_6$ | 23.2 |
| | 100.0 |

Chlorine in the product as HCl. 0.020 mole/hr.

This example illustrates that cyclohexane may be dehydrogenated to an effluent predominantly containing cyclohexene, rather than an effluent predominantly containing benzene which is obtained by conventional dehydrogenation processes.

EXAMPLE II

A mixed feed was dehydrogenated by effecting contacting thereof with a continuously circulating copper chloride melt, the melt being contacted with chlorine in a separate zone to maintain a constant level of cupric chloride in the melt.

| | | |
|---|---|---|
| Reaction temperature | °C | 429 |
| Reaction pressure | atm | 1 |
| Salt: | | |
| KCl | wt. percent | 30 |
| CuCl | do | 25 |
| $CuCl_2$ | do | 45 |
| Residence time | seconds | 8 |
| Duration of test | hours | 2 |
| Gas hourly space velocity, GHSV | | 94 |
| Feed composition, volume percent: | | |
| n-Hexane | | 18 |
| Methyl cyclopentane | | 32 |
| Cyclohexane | | 44 |
| Benzene | | 6 |
| Feed rate, liquid | ml./hr | 208 |
| Chlorine added | gm. moles/hr | 0.52 |
| Conversion, percent | | |
| n-Hexane | | 52.1 |
| Methyl cyclopentane | | 6.4 |
| Cyclohexane | | 17.2 |

Products

| Components: | Wt. percent of products collected |
|---|---|
| Hexenes | 76.2 |
| Cyclohexene | 9.7 |
| Benzene | 1.5 |
| $CH_4$ | 7.0 |
| $CO_2$ | 2.4 |
| $C_2H_4$ | 3.2 |

EXAMPLE III

Ethyl chloride was dehydrogenated by effecting contacting thereof with a copper chloride melt continuously circulating between the ethyl chloride contacting and contacting with an oxygen rich mixture composed of 75% oxygen and 25% nitrogen. The conditions were as follows:

| | |
|---|---|
| Reaction temperature ° C | 471 |
| Reaction pressure atm | 1 |
| Molten salt: | |
| KCl wt. percent | 30 |
| CuCl do | 54 |
| $CuCl_2$ do | 16 |
| Residence time seconds | 13 |
| Duration of test hours | 3 |
| Gas hourly space velocity, GHSV | 56 |
| Feed rate: Ethyl chloride gm. mole/hr | 1.70 |
| Ethyl chloride conversion percent | 35.6 |

Products

| Components: | Mole percent $C_2H_5Cl$ converted |
|---|---|
| $C_2H_4$ | 44.3 |
| $C_2H_3Cl$ | 10.3 |
| $C_2H_4Cl_2$ | 34.6 |
| $C_2H_2Cl_2$ | 5.4 |
| $C_2H_3Cl_3$ | 1.1 |
| $C_2HCl_3$ | 1.6 |
| $C_2Cl_4$ | 1.3 |
| CO and $CO_2$ | 1.4 |
| $CH_4$ | 0.0 |
| | 100.0 |

The high production of dichloroethane is representative of the intermediate in the reaction sequence to vinyl chloride, hereinabove described, and the high production of ethylene is representative of the type of reaction which results as an intermediate reaction in the dehydrogenation of an alkane, such as ethane. These products may both be ultimately converted to vinyl chloride.

EXAMPLE IV

This example illustrates the dehydrogenation of a mixed feed predominantly comprised of saturated components to an effluent predominantly comprised of unsaturated components. The feed was contacted with a copper chloride containing melt which was continuously circulated between the feed contacting and contacting with an oxygen-nitrogen mixture containing 58% oxygen. The conditions were as follows:

| | |
|---|---|
| Reaction temperature ° C | 474 |
| Reaction pressure atm | 1 |
| Molten salt: | |
| KCl wt. percent | 30 |
| CuCl do | 37 |
| $CuCl_2$ do | 33 |
| Residence time seconds | 11 |
| Duration of test hours | 3.7 |
| Gas hourly space velocity, GHSV | 65 |
| Feed rate gm.-mole/hr | 0.89 |
| Feed rate, mole ratio: Ethane/ethylene/ethyl chloride/chlorine | 3.2/0.8/0.9/1.0 |
| Conversions: | |
| Ethane percent | 100 |
| Ethyl chloride do | 100 |

Products

| Components: | Mole percent product |
|---|---|
| $C_2H_4$ | 22.1 |
| $C_2H_3Cl$ | 40.6 |
| $C_2H_2Cl_2$ | 13.2 |
| $C_2H_4Cl_2$ | 0.6 |
| $C_2H_3Cl_3$ | 0.7 |
| $C_2HCl_3$ | 10.5 |
| $C_2Cl_4$ | 2.1 |
| CO and $CO_2$ | 10.1 |
| $CH_4$ | 0.1 |
| | 100.0 |

The chlorine was added to both increase the chlorination capacity of the melt and act as an initiator for the dehydrochlorination portion of the overall dehydrogenation sequence.

EXAMPLE V

Cyclododecane is dehydrogenated by effecting contacting thereof with a copper chloride melt continuously circulating between the cyclododecane contacting step and contacting with an oxygen rich mixture containing 75% oxygen and 25% nitrogen. The conditions are as follows:

| | |
|---|---|
| Reaction temperature ° C | 496 |
| Reaction pressure atm | 1 |
| Molten salt: | |
| KCl wt. percent | 28 |
| CuCl do | 30 |
| $CuCl_2$ do | 42 |
| Residence time sec | 2.0 |

The reaction product contains cyclododecene.

EXAMPLE VI

The procedure of Example V is repeated except that ethyl benzene is the feed dehydrogenated.

The reaction product contains styrene.

EXAMPLE VII

The procedure of Example V is repeated except that pentane is the feed dehydrogenated.

The reaction product contains pentene.

EXAMPLE VIII

The procedure of Example V is repeated except that the melt has the following composition:

| | Wt. percent |
|---|---|
| $FeCl_2$ | 58 |
| $FeCl_3$ | 8 |
| KCl | 34 |

The reaction product contains cyclododecene.

EXAMPLE IX

The procedure of Example V is repeated except that the feed is propane and the melt has the following composition:

| | Wt. percent |
|---|---|
| $MnCl_2$ | 3 |
| $MnCl_4$ | 80 |
| KCl | 17 |

The reaction product contains propylene.

EXAMPLE X

The procedure of Example V is repeated except that the feed is ethyl benzene and the melt has the following composition:

| | Wt. percent |
|---|---|
| $CoCl_2$ | 14 |
| $CoCl_3$ | 49 |
| KCl | 37 |

The reaction product contains styrene.

EXAMPLE XI

The procedure of Example V is repeated except that the feed is cyclohexane and the melt has the following composition:

| | Wt. percent |
|---|---|
| $CrCl_2$ | 5 |
| $CrCl_3$ | 74 |
| KCl | 21 |

The reaction product contains cyclohexene.

EXAMPLE XII

Propane is dehydrogenated by effecting contacting thereof with a copper chloride melt continuously circulating between the propane contacting and contacting with an oxygen rich mixture composed of 75% oxygen and 25% nitrogen. The conditions are as follows:

| | | |
|---|---|---|
| Reaction temperature | ° C | 496 |
| Reaction pressure | atm | 1 |
| Molten salt: | | |
| KCl | wt. percent | 28 |
| CuCl | do | 30 |
| CuCl$_2$ | do | 42 |
| Residence time | sec | 2.0 |
| Duration of test | hours | 2 |
| Gas hourly space velocity, GHSV | | 344 |
| Feed rate, gm.-mole/hr.: Propane vapor | | 0.56 |
| Propane conversion | percent | 15.0 |

The reaction effluent contains predominately propylene.

EXAMPLE XIII

The procedure of Example XII is repeated except that the melt is not contacted with an oxygen rich mixture.

The reaction effluent contains propylene.

The hereinabove examples are also repeated with bromides and iodides of the multivalent metals with similar results.

The process of the invention is an improvement over the dehydrogenation processes heretofore employed in the art in that the dehydrogenation is effected at a lower temperature, resulting in controlled selectivity to the desired olefinically unsaturated compound. Thus, for example, propane may be dehydrogenated to produce a reaction effluent predominantly containing propylene rather than as heretofore in the art, a reaction effluent predominantly containing ethylene. Moveover, cyclohexene may be readily produced from cyclohexane without an uncontrolled dehydrogenation to benzene. These and other advantages of the invention should be apparent to those skilled in the art.

Numerous modifications and variations in the present invention are possible in light of the above teachings and, therefore, it is to be understood that the invention may be practiced otherwise than as particularly described.

What is claimed is:

1. A process for producing an alkene, comprising:
contacting an alkane, in vapor form, with an unsupported molten mixture including cuprous chloride, cupric chloride and copper oxychloride at a temperature from about 700 F. to about 1200° F. to produce an alkene having the same number of carbon atoms as the alkane.

2. The process as defined in claim 1 wherein the molten mixture includes a univalent metal halide.

3. The process as defined in claim 2 wherein the univalent metal halide is an alkali metal chloride.

4. The process as defined in claim 3 wherein the alkali metal chloride is potassium chloride.

5. The process as defined in claim 2 wherein the alkane is ethane and the alkene is ethylene.

6. The process as defined in claim 2 wherein the alkane is propane and the alkene is propylene.

7. A process for producing an alkene, comprising:
(a) contacting an unsupported molten mixture including cuprous and cupric chloride with molecular oxygen to convert a portion of the cuprous chloride to copper oxychloride;
(b) contacting the molten mixture of step (a) including cuprous chloride, cupric chloride and copper oxychloride, with an alkane, in gaseous form, said contacting being effected at a temperature of 700° F. to 1200° F. to produce an alkene having the same number of carbon atoms as the alkane; and
(c) passing the molten mixture from step (b) to step (a).

8. The process as defined in claim 7 wherein the molten mixture includes a univalent metal halide.

9. The process as defined in claim 8 wherein the univalent metal halide is an alkali metal chloride.

10. The process as defined in claim 7 wherein the molten mixture includes potassium chloride in an amount from about 20% to about 40%, by weight.

11. The process as defined in claim 10 wherein the alkane is propane and the alkene is propylene.

12. The process as defined in claim 10 wherein the alkane is ethane and the alkene is ethylene.

References Cited
UNITED STATES PATENTS

| | | | |
|---|---|---|---|
| 3,449,458 | 6/1969 | Tiedje et al. | 260—669 |
| 2,407,828 | 9/1946 | Gorin | 260—659 A |
| 2,418,930 | 4/1947 | Gorin | 260—659 A |
| 2,418,931 | 4/1947 | Gorin | 260—659 A |
| 2,498,552 | 2/1950 | Kilgren et al. | 260—659 A |
| 2,838,577 | 6/1958 | Cook et al. | 260—656 |
| 3,080,435 | 3/1963 | Nager | 260—673.5 |
| 3,210,158 | 10/1965 | Engel et al. | 252—441 X |
| 3,210,431 | 10/1965 | Engel | 252—441 X |
| 3,214,481 | 10/1965 | Heinemann et al. | 252—441 X |
| 3,232,889 | 2/1966 | Bellis | 252—441 |
| 3,332,885 | 7/1967 | Imoto et al. | 252—441 X |

DELBERT E. GANTZ, Primary Examiner

G. E. SCHMITKONS, Assistant Examiner

U.S. Cl. X.R.

252—441; 260—659 A, 666 A, 669 R, 677 XA, 680 E